United States Patent
Wong et al.

[11] Patent Number: 5,550,649
[45] Date of Patent: Aug. 27, 1996

[54] MULTI-FUNCTION TELECOMMUNICATIONS INSTRUMENT

[75] Inventors: John J. Wong, Atherton; Paul S. Lui, Saratoga, both of Calif.

[73] Assignee: Current Logic Systems, Inc., Fremont, Calif.

[21] Appl. No.: 882,935

[22] Filed: May 14, 1992

[51] Int. Cl.$^6$ .................................................. H04N 1/04
[52] U.S. Cl. .......................... 358/479; 358/442; 358/444; 358/468; 379/100
[58] Field of Search .............................. 358/434, 439, 358/435, 436, 437, 438, 444, 440, 409, 468, 404, 479, 141, 142, 143, 442; 379/100, 96, 90, 53, 54, 85, 88, 89; 375/5

[56] References Cited

U.S. PATENT DOCUMENTS

| | | | |
|---|---|---|---|
| 2,578,714 | 12/1951 | Martin | 358/425 |
| 3,723,637 | 3/1973 | Fujio et al. | 358/145 |
| 3,873,771 | 3/1975 | Kleinerman et al. | 379/53 |
| 4,071,697 | 1/1978 | Bushnell et al. | 379/88 |
| 4,461,013 | 7/1984 | Lese et al. | 375/5 |
| 4,581,484 | 4/1986 | Bendig | 379/96 |
| 4,659,876 | 4/1987 | Sullivan et al. | 379/96 |
| 4,825,461 | 4/1989 | Kurita et al. | 379/100 |
| 4,837,798 | 6/1989 | Cohen et al. | 379/88 |
| 4,907,094 | 3/1990 | Mishima et al. | 358/404 |
| 4,922,546 | 5/1990 | Takahashi et al. | 379/100 |
| 5,008,926 | 4/1991 | Misholi | 379/100 |
| 5,027,386 | 6/1991 | Hisano | 379/100 |
| 5,131,026 | 7/1992 | Park | 379/100 |
| 5,131,992 | 7/1992 | Yurk et al. | 358/86 |
| 5,159,624 | 10/1992 | Makita | 379/100 |
| 5,187,591 | 2/1993 | Guy et al. | 358/434 |
| 5,192,999 | 3/1993 | Groczyk et al. | 358/903 |
| 5,204,893 | 4/1993 | Choi et al. | 379/53 |
| 5,291,302 | 3/1994 | Gordon et al. | 358/400 |
| 5,347,305 | 9/1994 | Bush et al. | 348/14 |
| 5,359,644 | 10/1994 | Tanaka et al. | 348/17 |
| 5,373,316 | 12/1994 | Ishinabe et al. | 379/100 |
| 5,381,412 | 1/1995 | Otani | 348/14 |

*Primary Examiner*—Scott A. Rogers
*Assistant Examiner*—Fan Lee
*Attorney, Agent, or Firm*—Majestic, Parsons, Siebert & Hsue

[57] ABSTRACT

A telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others.

10 Claims, 8 Drawing Sheets

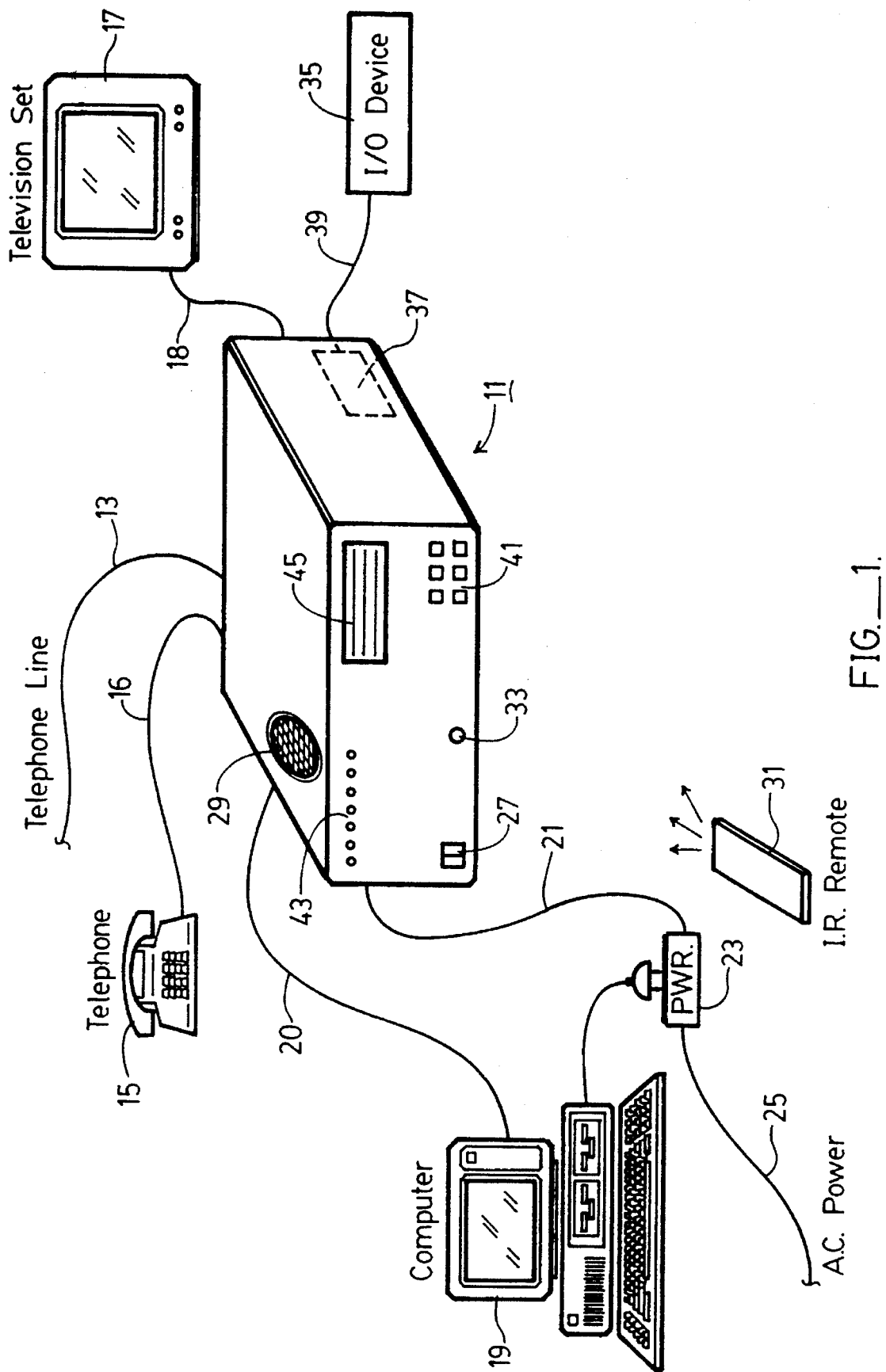
FIG._1.

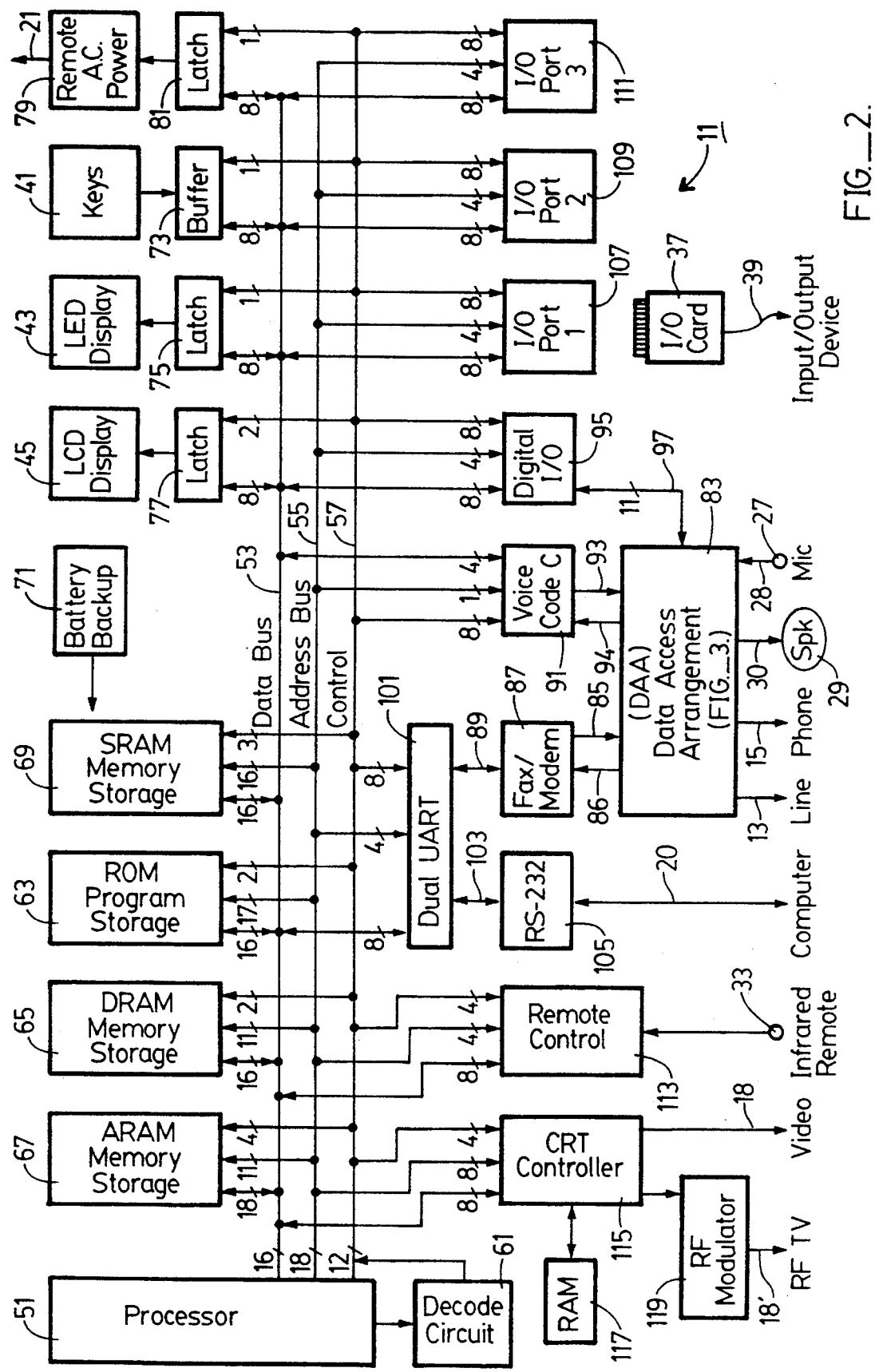
FIG._2.

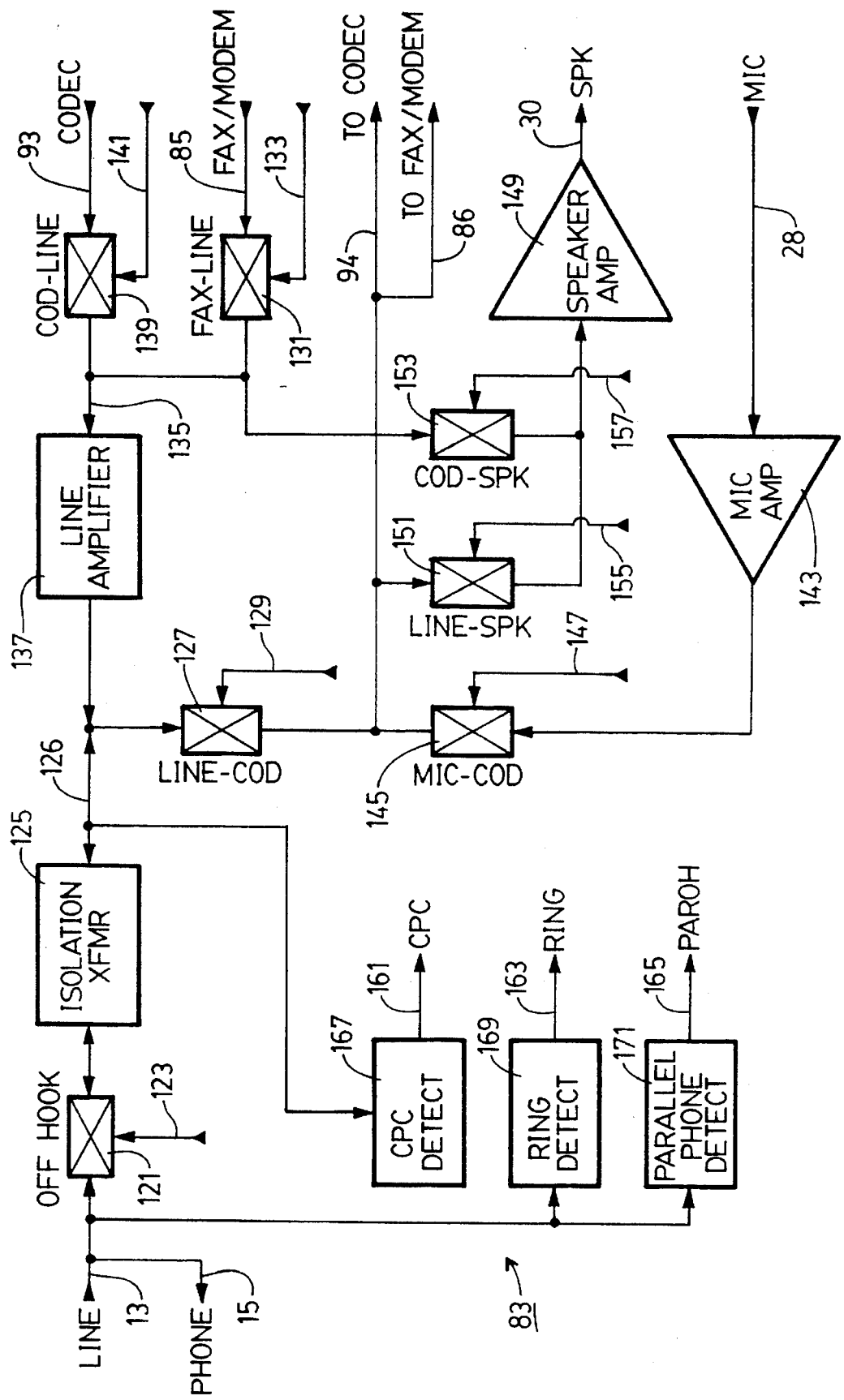
FIG._3.

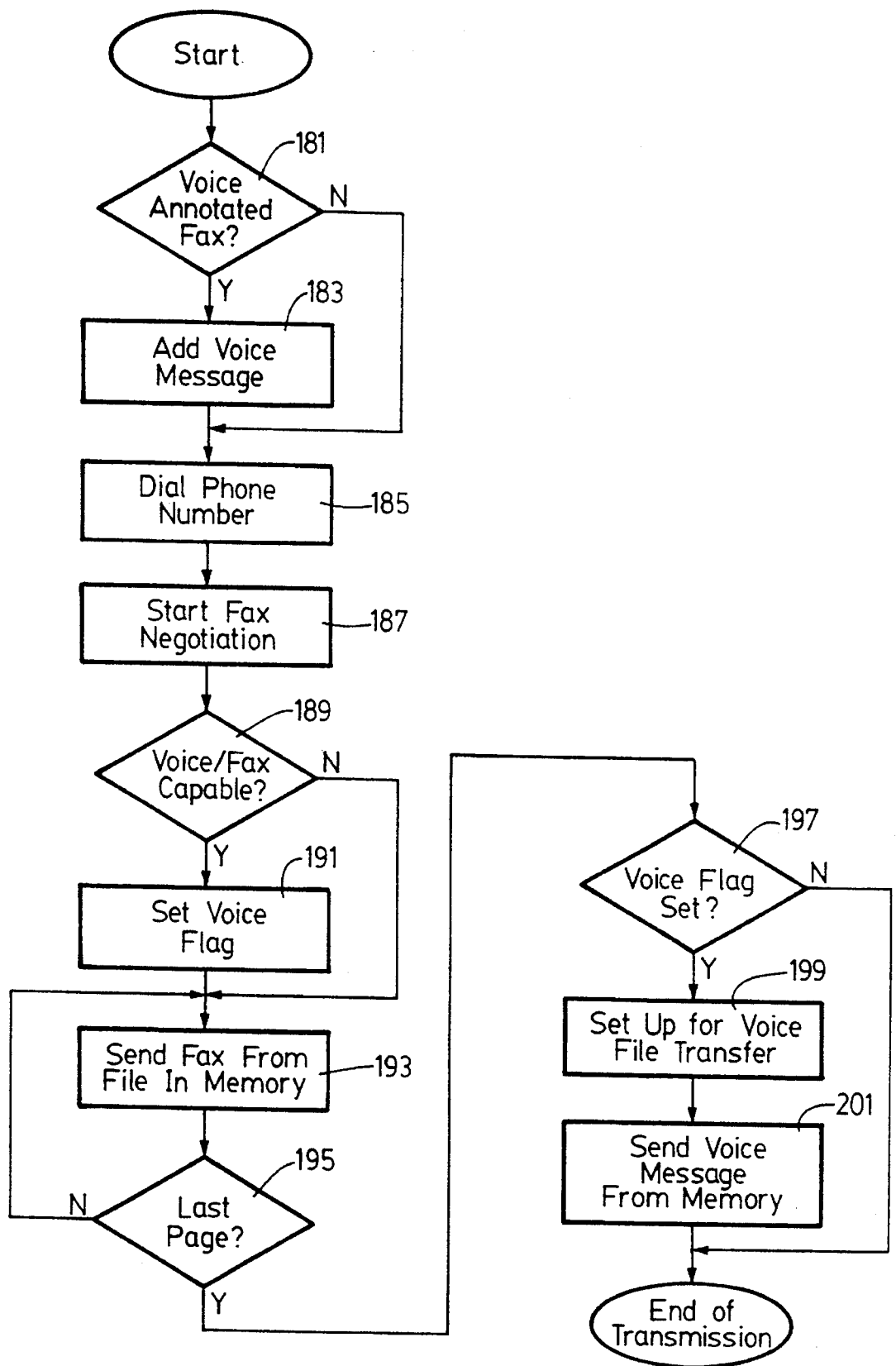
FIG._4.
(Fax/Voice Transmission)

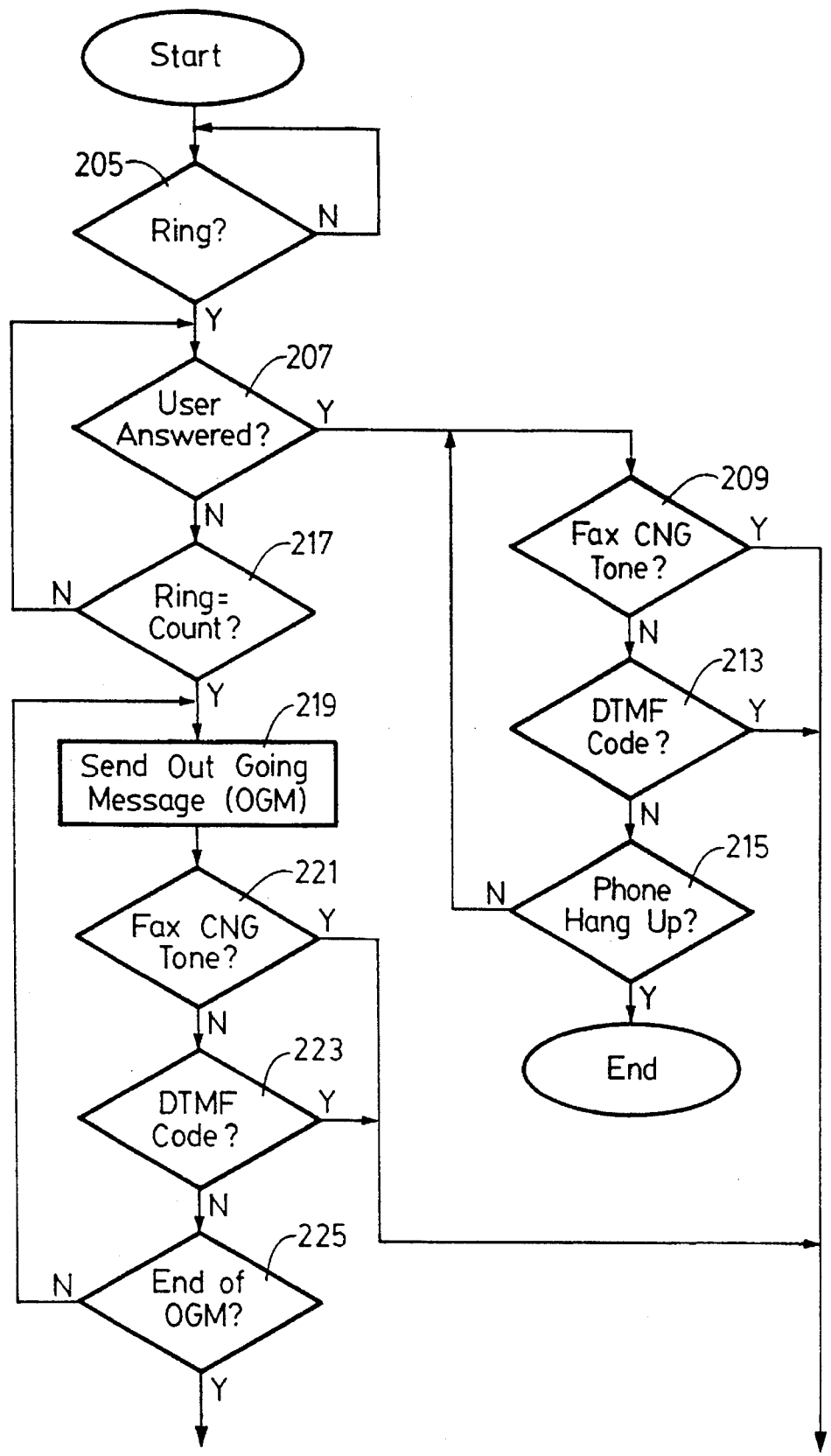
FIG._5A
(Voice/Fax Receipt)

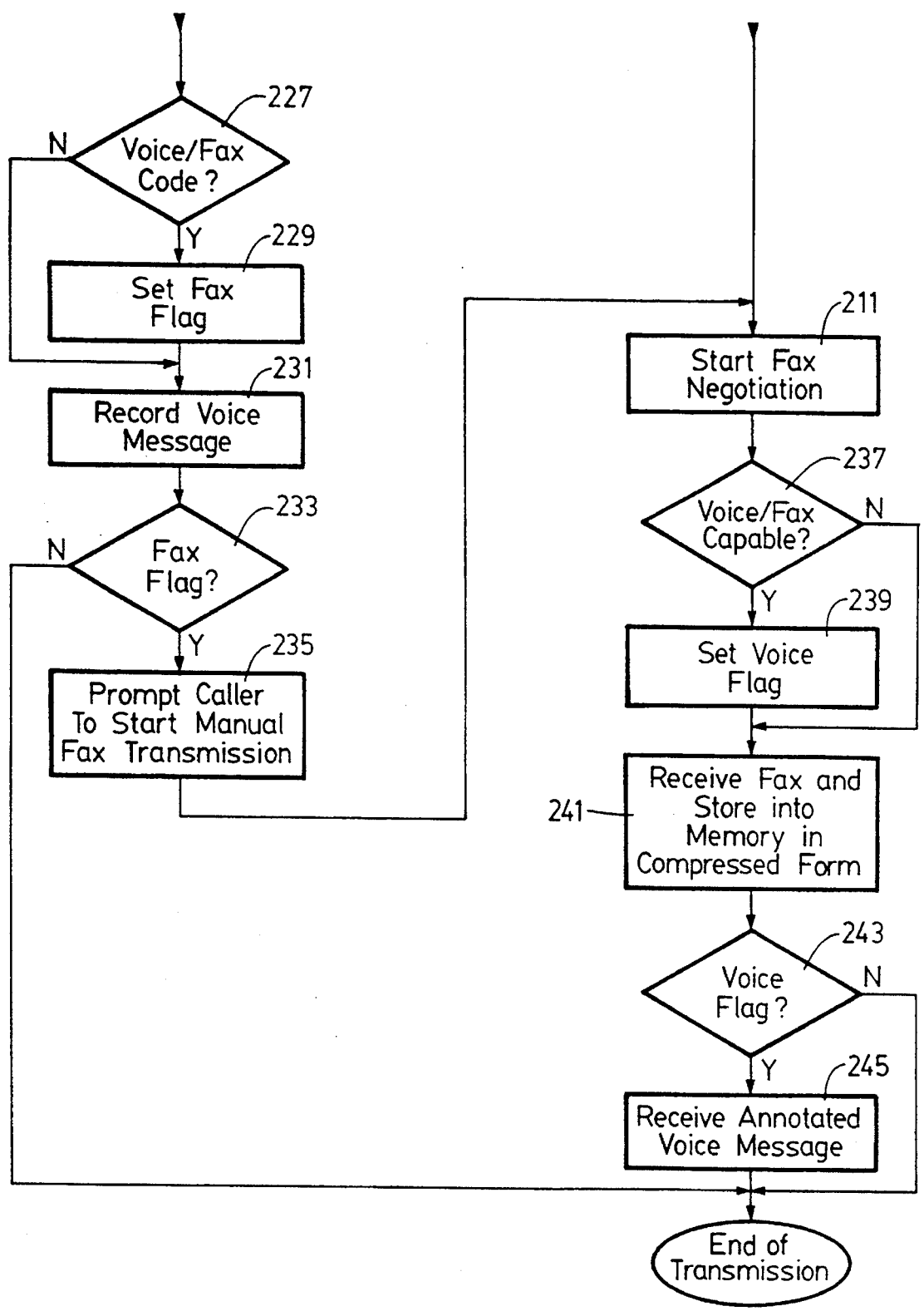
FIG._5B
(Voice/Fax Receipt)

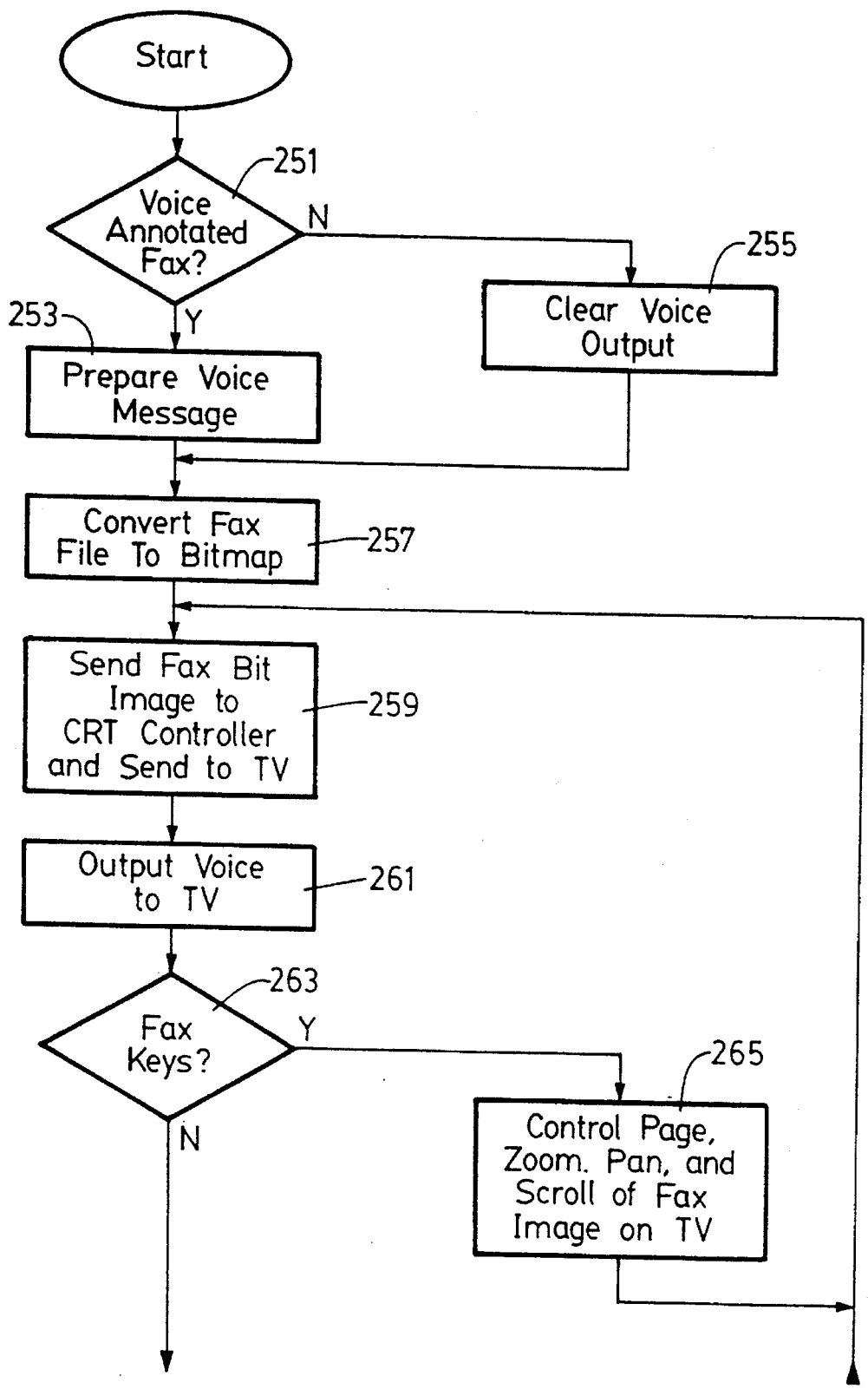
FIG._6A
(Voice/Fax Display)

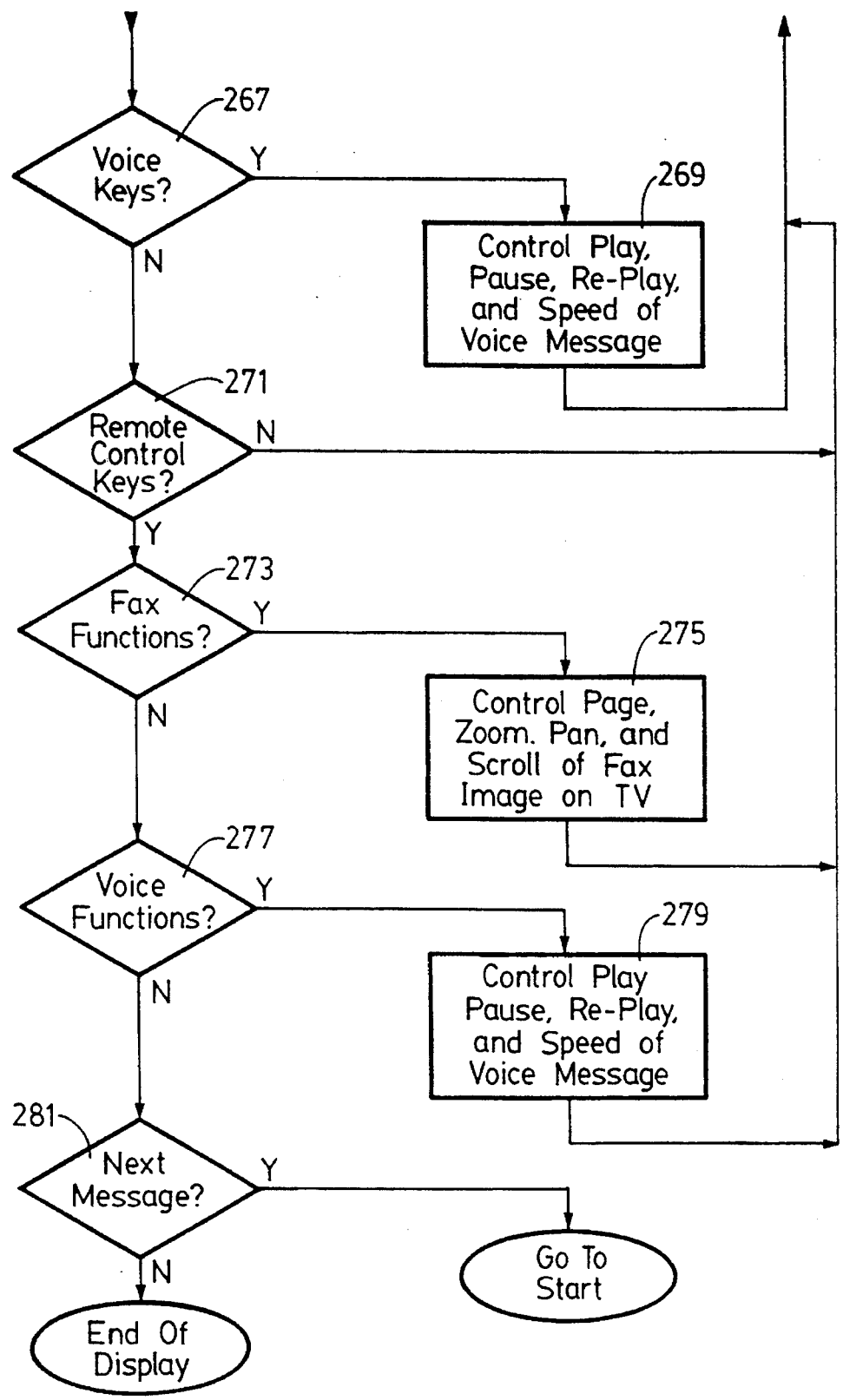
FIG._6B
(Voice/Fax Display)

MULTI-FUNCTION TELECOMMUNICATIONS INSTRUMENT

BACKGROUND OF THE INVENTION

This invention relates generally to devices adapted for a communication over telephone lines, such as facsimile, modem, telephone answering, and similar types of devices.

The use of facsimile (fax) machines is currently exploding. Not only have such instruments found widespread use for the communication of business documents through the telephone system but private use between homes is also increasing. Similarly, the use of telephone answering machines for storing voice messages is also widespread in both businesses and homes. Further, the use of telephone lines for transmitting computer data is increasing, requiring a telephone modem at each end of the communication link.

Therefore, it is a primary object of the present invention to provide techniques for improving the usefulness and flexibility of use of such telecommunication functions.

SUMMARY OF THE INVENTION

This and additional objects are accomplished by the present invention, wherein, briefly and generally, a telecommunications terminal is provided for business or home use which integrates at least voice and fax functions, and optionally a computer data modem as well. The terminal automatically detects voice and fax in a single transmission and treats them either separately or together. According to a more specific aspect of the present invention, the telecommunications instrument is provided with circuits for connection to an ordinary television set for displaying a received fax on the screen. Accordingly to an even more specific aspect of the present invention, an ability is provided for playing a recorded voice message through a connected television set, or other similarly functioning device, at the same time that a stored fax is visually displayed on the television screen. All of this is accomplished by an instrument architecture, according to a preferred embodiment, that includes a single processor through which various input/output circuits, telephone interface line circuits, various forms of digital memory, and other necessary circuits are connected. Such an instrument is especially adapted for homes or small businesses where it is connected with a single telephone line and serves a single telephone handset, although it is not limited to such use.

Additional objects, features and advantages of the various aspects of the present invention will become apparent from the following description of a preferred embodiment thereof, which description should be taken in conjunction with the accompanying drawings.

BRIEF DESCRIPTION OF THE DRAWINGS

FIG. 1 shows, in general, various uses of the telecommunications instrument and terminal of the present invention;

FIG. 2 is a schematic block diagram of the electronic system contained within the telecommunications instrument of FIG. 1;

FIG. 3 shows additional details of the data access arrangement (DAA) block of the system of FIG. 2;

FIG. 4 is a flow diagram showing operation of the telecommunications instrument of FIGS. 1–3 in a transmit mode;

FIG. 5 is a flow diagram showing operation of the telecommunications instrument of FIGS. 1–3 in a receive mode; and FIG. 6 is a flow diagram that shows the operation of the telecommunications instrument of FIGS. 1–3 to display a previously stored fax on a television screen, with or without playing back through the television sound system an accompanying stored voice message.

DESCRIPTION OF A PREFERRED EMBODIMENT

Referring to FIG. 1, the general features of a telecommunications terminal or instrument 11 in accordance with the present invention will be described before proceeding to a detailed description of its hardware architecture and the software which controls it. At a minimum, the instrument 11 will be connected to a telephone line by a cable 13, such as one having a standard telephone jack at its free end. Depending upon the function to which the instrument 11 is to be placed, it will generally be connected to additional external devices. A telephone handset 15 will nearly always be used. In order to display received faxes, the instrument 11 is preferably connected with a standard television set 17 but can, alternatively, be connected with a standard computer system 19 for that purpose. The computer system 19, if utilized, can also provide other functions, such as storing on its hard or floppy disk drives telephone or fax data in excess of the amount that is stored by solid state memory within the instrument 11 itself. Since the instrument 11 also contains a modem circuit, the computer 19 can communicate digital data over the telephone line through the instrument 11 without having to have a separate modem.

The instrument 11, in this example, also provides a control signal in a line 21 to switch a power strip 23 on and off, in order to provide the capability of remotely connecting the computer system 19 to a power source 25. This allows the business or home user of the instrument 11 to remotely turn on or off the computer 19, or some other device, by telephone access. Further, this allows the instrument 11 to be configured to automatically turn on power to the computer 19 when a message memory is approaching its capacity.

A microphone 27 is built into the instrument 11 to allow recording of memoranda and outgoing telephone messages. A loudspeaker 29 is similarly provided as part of the instrument 11 as a means of playing back stored voice messages. The loudspeaker 29 can also be used to provide voice instructions to the user on how to operate the unit. The capability for use of a hand held remote control unit 31 is also optionally provided, by inclusion of an infra-red sensor 33 on a front panel of the instrument 11.

In addition to the telephone, television set and computer, provision is provided for connection of a number of additional types of input/output devices, if desired. Such an additional device 35 is provided with its own circuit card 37 with which it is connected over lines 39. In this example, provision is made for accepting up to three such printed circuit cards within the instrument 11, thus allowing up to three such additional input/output devices to be utilized at one time. One or more devices can be connected for providing an input of data to be sent by fax through the instrument 11 to a remote fax unit. These include a standard keyboard, a mouse, a scanner and a pen based tablet. A printer is another device that can be so connected in order to directly print out faxes. Another input/output card can be provided for connecting the instrument 11 to a computer network. The further card can be provided for remotely turning on and off electrical appliances, lights, and the like, which is especially useful for users that have the instrument 11 installed in their home. Additionally, an input/output circuit card can be provided for making the instrument 11 as part of a home security system by remotely dialing present numbers when security sensors are tripped, and/or responding to an inquiry from a remote location as to the status of such sensors. These are examples of readily available input/output devices but the instrument 11 is not limited to use with only this group of devices.

A group 41 of control switches of a standard type are provided on the front panel of the instrument 11. These provide appropriate user control of various functions, such as the following: power on/off, voice receiving and recording capability on or off, fax receiving capability on or off, to set a number of rings before the instrument 11 answers an incoming telephone call, loudspeaker volume control, the initiation and control of voice message playback, and the initiation and control of the playback of stored faxes.

Similarly, a group 43 of indicator lights, preferably light emitting diodes (LEDs), are included. An individual LED is provided to indicate one of many possible functions, such as whether power is connected to the unit, whether the voltage of internal backup batteries is low, whether there is a stored fax or not, whether there is a stored voice message or not, whether the telephone line to which the instrument 11 is connected is on or off hook, and similar functions.

In addition to the group 43 of LEDs, a liquid crystal display (LCD) 45 is optionally provided on the front of the instrument 11. Such a display may, for example, show two lines of 16 alpha-numeric characters each. It can provide various status messages such as the mode in which the unit is currently operating. In a standby mode, the time may be shown on one line and the number of both fax and voice messages that have been received on the other line, for example. The telephone number of a caller can also be displayed, where that is provided by the telephone company, and, if the instrument 11 includes a table of individual names associated with frequently received telephone calls, the caller's name can be displayed.

With reference to FIG. 2, an example of an electronic architecture for the telecommunications instrument 11 is explained. A single processor 51 is connected to an internal bus structure including a data bus 53, an address bus 55 and a control bus 57. The processor 51 may be, for example, an integrated circuit product available from National Semiconductor under part number NS32AM160. This part combines a central processing unit (CPU) and a digital signal processor (DSP). The DSP portion of the processor 51 is dedicated principally to performing manipulations of voice data while the CPU portion is dedicated primarily to overall system control and the performance of various overhead functions. A separate decoding circuit 61 provides certain of the control signals of the control bus 57 from the CPU within the processor 51.

Four types of memory are connected to the internal bus structure. A read only memory (ROM) 63 is a non-volatile type and holds the controlling program for the processor 51. A dynamic random access memory (DRAM) 65 provides storage for fax data. Since voice information does not need to be stored with such a high degree of accuracy as fax information, a lower cost audio random access memory (ARAM) 67 is used for voice. A fourth memory block 69, a static random access memory (SRAM) provides the data scratch pad and a place into which input/output programs can be stored for operating the I/O card 37 to drive a specific input/output device. Each such I/O card will contain a software driver for its input/output device and this could be accessed directly by the processor 51 but it is preferred to load the software from each such card into the SRAM 69 upon turning the power onto the device or otherwise resetting it. The processor 51 then uses the I/O card software that is stored in the SRAM 69. In order to avoid loss of information in the volatile memories 65, 67 and 69, a battery power source 71 is provided within the instrument 11.

The panel switches 41 are connected through a buffer circuit 73 to the internal bus. Similarly, the LED display 43 is connected to the internal bus through a latching circuit 75. Also, the LCD display 45, if utilized, communicates through a latching circuit 77 to the internal bus. The remotely controlled power signal in circuit 21 originates from a power circuit 79 that communicates with the system bus through the latch circuit 81.

A data access arrangement (DAA) circuit 83 communicates with the telephone line 13, the telephone handset connection 15, the speaker 29 through a circuit 30 and receives signals in a circuit 28 from the internal microphone 27. The DAA 83 communicates over lines 85 and 86 with a circuit 87 that handles fax and computer data. The circuit 87 may be, as an example, implemented by an available Rockwell 9624AC integrated circuit chip set. Another circuit 91 processes voice signals received from the DAA in analog form on a line 94, and also sends voice signals in analog form over the line 93. The circuit 91 includes both a digital-to-analog converter to translate a digital signal on the system bus to one in analog form on the line 93, and an analog-to-digital converter to translate an analog signal on the line 94 to one in digital form on the system bus. An example product that can be employed as the voice circuit 91 is a National Semiconductor CODEC integrated circuit chip, part no. TP5512. A digital control circuit 95 communicates between the system bus and the DAA 83 over circuits 97 in order to provide necessary control and supervision of the operation of the DAA 83 from the processor 51.

A circuit 101 is interfaced between the system bus and the connection 89 with the fax and computer data circuit 87. The circuit 101 is a universal asynchronous receiver/transmitter (UART) such as part number 16C452 available from Macronix, Inc., assignee of the present application. This part has two serial ports, one of which is connected to the circuits 89 and the other of which is connected through circuits 103 to another circuit 105 that interfaces the system with a computer over line 20 in an industry standard RS-232 format.

The system of FIG. 2 is provided with three sockets 107, 109 and 111 for receiving additional I/O cards, such as card 37, for connection to a specific input/output device of the types described previously. Each of these sockets is connected to selected lines of the internal system bus. They are part of individual slots which will accept a printed circuit card such as the I/O card 37, and thus allow the processor 51 to communicate directly with them over the system bus. As briefly mentioned previously, driving software for such an input/output device is generally stored in non-volatile memory on the I/O card 37 itself. This software is read from that card into the SRAM 69 upon power-up or other reset of the system. This one time loading the software from the I/O card 37 is accomplished by an 8-bit I/O transfer, thus reducing the number of pins necessary to have on the sockets and I/O cards. If the memory on the card were to be accessed directly by the processor 51 each time the card is used, additional pins would be necessary in order to provide a parallel connection with the I/O card memory in order for it to operate fast enough.

A circuit 113 is a standard remote control circuit for communicating pulses detected by the infrared sensor 33 and communicating them to the system bus. A cathode-ray tube (CRT) controller circuit 115 is also connected with the system bus and provides signals in the circuit 18 which can be connected directly to a monitor input of a standard television set or monitor. An amount of RAM 117 is provided for exclusive use by the CRT controller 115. In order to be able to operate with television sets that do not have a monitor input, a radio frequency (RF) modulator circuit 119 is included to modulate the video signal from the CRT controller onto a carrier that can then be connected by way of a circuit 18' to an antenna input of a standard television set.

Referring to FIG. 3, the DAA circuit 83 is shown. A switch 121 is responsive to a control signal in a line 123 to controllably connect an isolation transformer 125 with the telephone line 13. Connected to an opposite side of the isolation transformer 125 is a switch 127 that toggles between on and off positions in response to a control signal in the line 129. When closed, a signal path is created that extends from the isolation transformer to the lines 86 and 94 for carrying analog signals to both the fax/modem circuit 87 and voice circuit 91 (FIG. 2). Data in analog form travels from the fax/modem circuit 87 (FIG. 2) through a switch 131 that, when closed in response to a control signal in a line 133, connects signals in a line 85 to a circuit 135 at an input of a line amplifier 137. An output of the line amplifier passes by way of the circuit 126 through the isolation transformer 125 and out on the telephone line 13 when the switch 121 is closed. Similarly, voice signals on line 93 from the circuit 91 (FIG. 2) are connected to the input 135 of the line amplifier 137 when a switch 139 is closed by an appropriate signal on a line 141. Closing of the switch 139 provides a similar connection of voice analog signals through the amplifier 137 and onto the telephone line 13, when the switch 121 is closed. Of course, only one of the switches 131 and 139 will be closed at one time. When one of them is closed, the switch 127 will generally be opened.

The microphone output in the circuit 28 is amplified by an amplifier 143 (FIG. 3), whose output is passed through another switch 145 to the switch 127. Thus, when the switch 145 is closed in response to a control signal in a line 147, the microphone can be connected through the line 94 to the voice circuit 91 (FIG. 2). When this occurs, the switch 127 will remain open. A microphone can then be used to record an outgoing message for the telephone answering function of the circuit of FIG. 2.

Similarly, the loudspeaker is driven through a circuit 30 from an amplifier 149 that has an input to which switches 151 and 153 are connected, being controlled by signals in respective lines 155 and 157. When the switches 127 and 151 are closed, the loudspeaker amplifier 149 is connected to the telephone line 13, assuming that the switch 121 is also closed. When the switches 153 and 139 are closed, the amplifier 149 has its input connected to the output line 93 of the voice circuits 91 (FIG. 2). This later connection allows the user to listen to a message or other voice information that is stored in the memory of the instrument. Only one of the switches 151 and 153 will be closed at a time.

Each of the switch control lines 123, 129, 133, 141, 147, 155 and 157 of FIG. 3 are part of the control lines 97 (FIG. 2) interconnecting the DAA circuit 83 with a digital input/output circuit 95. The state of each of these switches is individually controlled by the processor 51 which communicates controlling signals through the system bus and the digital input/output circuit 95. The circuits 97 connected to the digital input/output circuit 95 also include status signals in lines 161, 163 and 165. The processor can observe the status signals through the circuit 95 and the system bus of FIG. 2. The line 161 provides the processor 51 with a change in signal when a circuit 167 notes that the calling party has terminated the telephone call. The processor 51 then responds by terminating the current operation that depends upon that telephone connection being made. Similarly, a circuit 169 provides an indication in the line 163 when a ring signal is present on the telephone line 13. Finally, a circuit 171 provides in the line 165 an indication of whether the local telephone handset 15 (FIG. 1) is picked up or not.

The telecommunications instrument architecture, as described with respect to FIGS. 2 and 3, allows a wide variety of operations to be implemented, and in a number of alternative ways. The operational flow diagrams of FIGS. 4, 5 and 6 present one specific set of operational capabilities that combines the handling of voice and fax together.

Referring to FIG. 4, a first step in sending a fax is indicated by a step 181 wherein the CPU within the processor 51 is directed by its controlling program stored in the ROM 63 to interrogate whether the user has indicated by actuating an appropriate one or combination of the switches 41 that a voice is to be sent along with the fax. At this point, data of the fax is already present in the DRAM 65, having been stored there by an appropriate input source of a type described previously that is connected to one of the input/output ports 107, 109 or 111 (FIG. 2). The purpose of the step 181 is to indicate whether a voice message is to accompany the fax.

If a voice message is to be included, a step 183 indicates that a voice message is being recorded. For this, the CPU within the processor 51 closes the switch 145 (FIG. 3) while keeping all other switches within the DAA 83 open. The voice signal from the microphone 27 is then routed to the voice circuit 91 (FIG. 2) and a digitized version of the voice message stored in the ARAM 67.

A next step 185 is for the user to initiate the dialing of the remote phone number, either by reading out of memory or by operating the switches 41. Once connection with a remote system is made, standard fax identifying codes are sent and received so that the fax/modem circuit 87 (FIG. 2) has its parameters set to communicate with the type of instrument at the other end. One thing that is determined during this pre-sending period, as indicated by another step 189, is whether the remote instrument is capable of handling voice and fax data together. That is, a determination of whether the same type of instrument as being described herein is present at the other end. If so, a flag is set in an appropriate register within the processor 51, as indicated by a step 191. If not, the step 191 is skipped.

In either event, as indicated by a step 193, the fax previously stored in the DRAM 65 is sent. The fax/modem circuit 87 (FIG. 2) receives the data and converts its data into appropriate tone signals in a line 85, while the DAA 11 (FIG. 3) has its switches 131 and 121 closed by the CPU within the processor 51 executing an instruction, the remaining switches of the DAA 11 remain open. The fax is continued to be sent until it has detected, as indicated in a step 195 of FIG. 4, that the last page has been sent.

After transmission of the fax has been completed, a next step 197 checks the CPU voice flag that would have been set in step 191 if it was determined during the pre-message communications with the opposing instrument that the instrument can handle both fax and voice data. If not, the previously recorded voice message is not sent, but rather the process ends. If the opposite instrument does have such a voice capability, however, as indicated by steps 199 and 201, the CPU within the processor 51 prepares for a binary file transfer of the digitized voice message from the ARAM 67 and sends that data through the fax/modem circuit 87 in a similar way as the fax binary data was previously sent from the DRAM 65. This method of sending a voice message avoids having to reconstruct an analog voice signal from the stored data before sending the message over the telephone line. Tones representative of the binary data are generated in the fax/modem circuit 87 sent over the telephone line and then directly reconverted into binary data at the opposite end and stored in its similar ARAM. Of course, the analog voice signal can alternatively be reconstructed for sending to a remote instrument that is not equipped to handle this protocol.

With reference to FIG. 5, operation of the system of FIGS. 2 and 3 for receiving a voice and/or fax message is described. In a first step 205, the CPU of the processor 51 responds to a ring signal in the line 163 (FIG. 3) to initiate a receive sequence. A next step 207 is for the CPU to determine, by monitoring the signal in the line 165 (FIG. 3) whether the telephone handset at the receiving instrument has been answered or not.

If the local handset has been picked up, a next step 209 causes a local instrument to be set to look for a fax identifying tone from the remote instrument. Such a tone is detected in the fax/modem circuit 87, which is connected to the telephone line 13 through switches 127 and 121 (FIG. 3) that have been closed while all other switches of the DAA 11 remain open. If such a tone is detected, operation proceeds to a step 211 wherein the two instruments pass pre-message identifying information back and forth. If such a fax tone is not detected in a step 209, however, a next step 213 can be provided for responding to a certain touchtone signal combination from the local handset in order to set the local instrument into a fax receiving mode by proceeding to the step 211. If such a code is not received, a next step 215 looks for the local user to have hung up the handset, as can be detected from the control signal in the line 165 (FIG. 3). So long as the fax tone is not received from the remote instrument and the local user does not provide an instruction through the touchtone pad of the local telephone, the operational loop of FIG. 5 including steps 209, 213 and 215 will continue until one of those three events occurs. While the CPU is in that loop, voice communication can be proceeding between the remote and local instruments. Of course, as indicated by the step 215, the hanging up of the instrument by the local user will cause that loop to be broken and terminate the receive routine by proceeding to its end.

In the case where the result of the inquiry in the step 207 is that the local user has not answered the telephone, a next step 217 allows the unanswered state to continue for a certain number of rings equal to a preset count. Once that preset count has been exceeded, the instrument automatically answers the call by connecting its system to send a pre-recorded message, as indicated by a step 219. That pre-recorded message is read from the ARAM 67, sent through the voice circuit 91 and then out into the telephone line 13 through the closed switches 139 (FIG. 3) and 121 of the DAA 83. While that message is being sent, which is a standard form of greeting that users of telephone answering machines pre-record, a loop of the steps 221, 223 and 225 occur. In the step 221, receipt of a fax tone from the remote instrument will cause the operation to proceed to the step 211, the first of the fax receiving steps. The step 223 indicates that if a particular predetermined touchtone code is received by the sender during this time, that the operation will also proceed to the step 211. Once the step 225 detects the end of the sending of the prerecorded greeting, however, this loop is terminated and the step 221 and 225 cannot occur.

After the end of the prerecorded greeting has been sent by the local instrument, a next step 227 looks for a predetermined touchtone code which, if received, causes a flag to be set in an appropriate register within the processor 51, as indicated by a step 229. That flag indicates that the remote instrument is sending a combined voice and fax message. Even though the normal fax carrier has not been received from the remote unit, this flag is set to indicate that a fax will be coming after a voice message. If the predetermined touchtone is not received in the step 227, that indicates that only a voice message is to be stored, the instrument thus providing the function of a telephone answering machine. In either event, as indicated by a step 231, the voice message is received and stored in the ARAM 67 through the voice circuit 91 and the DAA 11 with appropriate switches closed under control of the CPU within the processor 51.

After the voice message is completed, the next step 233 of FIG. 5 looks at the processor register fax flag bit to see if it has been set. If not, the receiving function is completed and it is terminated. If that flag is set, a next step 235 sends a prompt to the remote terminal for it to start to send a fax. After that, the first pre-message fax communication of the step 211 begins.

As part of the pre-message communication, as indicated by a step 237, it is determined whether the remote terminal has the capability of providing a voice annotated fax. If so, a voice flag bit is set in an internal register of the processor 51 (FIG. 2), as indicated by a step 239. After that flag is set, or if the remote terminal is determined not to have that capability, a next step 241 receives the fax through the DAA 11, with its switches appropriately set under processor control, and the fax/modem chip 87.

After the fax has been received and stored in the DRAM 65, it is determined in a step 243 whether the processor register voice flag was set in a step 239. If not, the processing ends. If that flag was set, however, the step 245 indicates that the voice message is to be received and stored in the ARAM 67. Since such a message will be transmitted from a like instrument at the remote location in tone encoded digital form, rather than as a full analog voice signal, those digital voice samples are decoded and stored directly in the ARAM 67. This avoids having to digitize the incoming voice signal. Rather, only the tones corresponding to specific digital values are converted into those values before storing in the ARAM 67.

It will be noted from FIG. 5 that the instrument 11 being described has the ability to record voice messages in two formats. The voice message received in step 231 is a standard voice analog signal that results from any handset, that signal being digitized by the circuit 91 and then stored in the ARAM 67. The second way of receiving voice, as indicated by the step 245 of FIG. 5, is in a special format where the voice annotates the accompanying fax. Since this comes from a similar type of instrument, this voice message can be transmitted and stored digitally, in the manner described above. In either case, the voice message may accompany a fax but in the first case the voice and fax are sent from a standard fax machine, while in the latter case, the voice and fax are sent by the type of instrument being discussed herein.

With reference to FIG. 6, one operation of the instrument 11 to display either a fax alone or a voice annotated fax is given. A first step 251 with respect to any stored fax is to determine whether it has a voice message that is to be played along with it. This is determined from a fax message log stored in one of the memories that is a usual directory listing all faxes that have been stored and received. As part of the information about each such fax is whether it is voice annotated or not. If it is, a next step 253 determines the address of the voice message in the ARAM 67. If there is no such voice message, a step 255 makes sure that no voice message is retrieved.

A next step 257 of the FIG. 6 process is to retrieve the designated fax from the DRAM 65, perform any decompression of the data that is necessary and convert the data into bit-map form which is then stored in either the DRAM 65 or SRAM 69, as desired. That bit-map version of the fax is then sent, in a step 259, to the CRT controller 115 (FIG. 2) and stored in its RAM 117. A next step 261 outputs the addressed voice message to the television, monitor or computer system on which the fax is being displayed and which can also audibly play the voice message.

As the fax is being displayed and the voice message reproduced, they may be manipulated. A next step 263 responds to any user activation of the panel switches 41 to perform various manipulations of the visual display, as indicated by a step 265. Similarly, another step 267 identifies whether the user is manipulating the panel switches 41 in order to alter the way in which the voice message is being played, and, if so, the functions indicated by a step 269 can be implemented.

The same user control can be performed by use of the remote control unit 31 (FIG. 1). If, in a step 271 it is determined that the remote control is being used, it is determined in a step 273 whether the user is requesting to manipulate the fax being displayed. If so, the manipulations are accomplished in a step 275. Similarly, a step 277 responds to user manipulation of the voice reproduction, by performing the requested manipulations in a step 279. After a fax or voice manipulation is performed by any of the steps 265, 269, 275 or 271, the processing returns to the step 259 to continue sending the fax to the CRT controller 115, usually one page at a time.

A next step 281, after completing the display of one fax and the playing of its associated voice message, if any, is to look for a command to display another fax that is stored in the DRAM 65. When such a request is received, the process begins again with the step 251. If such a request is not received, the fax display function ends.

The use of a television set has an advantage that the user may play back all stored faxes and voice messages through this one output device. This can be performed with the convenience of the remote control. In addition, information of the status of the terminal may be displayed. Example status information includes the number of stored messages, the time they were received, various instrument configuration information, caller identification, if available, and telephone accounting data, such as the length of a call and where a call was placed. Any other output device having video display and sound reproduction capability can be used instead of a television set, such as a personal computer with a multi-media capability.

Although the present invention has been described with respect to a preferred embodiment thereof, it will be understood that the invention is entitled to full protection within the scope of the intended claims.

It is claimed:

1. A multi-function terminal adapted to be connected to a telephone communications line, comprising:

a digital processor connected to a bus structure, a first binary memory connected to said bus structure, wherein at least a portion of said first memory includes audio random access memory, means connectable to said telephone line and said bus structure for identifying voice signals on said telephone line, digitizing such signals and storing the digitized voice signals as data in said first memory, a second binary memory connected to said bus structure, facsimile means connectable to said telephone line and said bus structure for identifying facsimile document data on said telephone line and storing such digitized facsimile data in said second memory, means connected to said bus structure for reading voice and facsimile data from each of the first and second memories, converting means responsive to said reading means for converting said data into a form adapted to be connected with a television set to display the facsimile data and reproduce the voice signals thereon;

means responsive to an incoming telephone call to the terminal being answered by a user for causing said facsimile means to operate when either a facsimile identifying tone or a predetermined touchtone code is present on the telephone communications line, means responsive to an incoming telephone call to the terminal going unanswered for said preset number of rings for causing a message stored in said first binary memory to be sent on the telephone communications line, means also responsive to an incoming telephone call to the terminal going unanswered for a preset number of rings for causing said facsimile means to operate when either a facsimile identifying tone or a predetermined touchtone code is present on the telephone communications line during a time that the stored message is being sent on the telephone communications line, and means responsive to said stored message being sent in its entirety without either a facsimile identifying tone or a predetermined touchtone code being received for causing the voice storage meads to operate, thereby to store a voice message in said first memory.

2. The terminal according to claim 1 which additionally comprises:

means responsive to either of the first and second memories becoming filled to a level approaching its storage capacity for connecting power to an external computer system, and means responsive to operation of said power connecting means for thereafter directing at least one of the digitized voice signals or digitized facsimile data to said external computer system instead of to the respective first and second memories which is becoming filled.

3. The terminal of claim 1 wherein said facsimile data identifying and storing means comprises a facsimile decoder circuit for decoding said facsimile document data.

4. The terminal of claim 1 wherein said facsimile data comprises data compressed according to a CCITT facsimile format.

5. The terminal of claim 1 further comprising means connectable to said telephone line for retrieving and storing text data.

6. The terminal of claim 1 wherein said converting means further comprises an RF modulator.

7. The terminal of claim 1 wherein said converting means includes CRT controlling means for converting binary data into composite video signals which can be connected directly to a monitor input of a television set.

8. The terminal of claim 1 further comprising wireless remote control means for remotely operating said terminal.

9. A method for using a multi-function terminal adapted to be connected to a telephone communications line, said terminal including a digital processor connected to a bus structure, a first binary memory connected to said bus structure, a second binary memory connected to said bus structure, and a facsimile communication circuit, said method comprising the steps of:

(a) identifying voice signals on said telephone line, digitizing such signals and storing the digitized voice signals as data in said first memory, (b) identifying facsimile document data on said telephone line and storing such digitized facsimile data in said second memory, (c) reading voice and facsimile data from each of the first and second memories, (d) converting said data into a form adapted to be connected with a television set to display the facsimile data and reproduce the voice signals thereon;

(e) in response to an incoming telephone call to the terminal being answered by a user, causing said facsimile circuit to operate when either a facsimile identifying tone or a predetermined touchtone code is present on the telephone communications line, (f) in response to an incoming telephone call to the terminal going unanswered for said preset number of rings, causing a message stored in said first binary memory to be sent on the telephone communications line, (g) in response to an incoming telephone call to the terminal going unanswered for a preset number of rings, causing said facsimile circuit to operate when either a facsimile identifying tone or a predetermined touchtone code is present on the telephone communications line during a time that the stored message is being sent on the telephone communications line, and (h) in response to said stored message being sent in its entirety without either a facsimile identifying tone or a predetermined touchtone code being received, repeating step (a).

10. The method according to claim 9 which additionally comprises the steps of:

in response to either of the first and second memories becoming filled to a level approaching its storage capacity, connecting power to an external computer system, and thereafter directing at least one of the digitized voice signals or digitized facsimile data to said external computer system instead of to the respective first and second memories which is becoming filled.

* * * * *